US007818072B2

(12) United States Patent
Betzmeier et al.

(10) Patent No.: US 7,818,072 B2
(45) Date of Patent: Oct. 19, 2010

(54) PRESS CONTROL SYSTEM AND PRESS SIMULATOR

(75) Inventors: Dieter Betzmeier, Untermeitingen (DE); Ralf Schäfer, Augsburg (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 995 days.

(21) Appl. No.: 11/205,265

(22) Filed: Aug. 16, 2005

(65) Prior Publication Data

US 2006/0037375 A1 Feb. 23, 2006

(30) Foreign Application Priority Data

Aug. 19, 2004 (DE) ...................... 10 2004 040 093

(51) Int. Cl.
*G05B 13/02* (2006.01)
*G06F 19/00* (2006.01)

(52) U.S. Cl. ........................... 700/31; 700/47; 700/206

(58) Field of Classification Search ...................... 72/2, 72/20.1, 20.2; 700/127, 128, 28–31, 47–48, 700/51, 75, 117, 206; 703/7; 101/480, 483, 101/484, 494, 248
See application file for complete search history.

(56) References Cited

U.S. PATENT DOCUMENTS 4,639,881 A * 1/1987 Zingher ...................... 715/839
5,662,044 A * 9/1997 Loffler et al. ............... 101/492
5,797,288 A * 8/1998 Mas ............................. 72/7.1
6,022,154 A * 2/2000 Allen ........................... 400/76
6,522,422 B1 * 2/2003 Klingler et al. ............ 358/1.15
6,705,229 B2 * 3/2004 Frankenberger ............. 101/484
2001/0034592 A1 10/2001 Herman
2004/0117399 A1 * 6/2004 Dittmar et al. .............. 707/102

FOREIGN PATENT DOCUMENTS

DE 101 03 039 A1 10/2002

OTHER PUBLICATIONS

German Office Action dated Jun. 10, 2005, from DE 10 2004 040 093.8.

* cited by examiner

*Primary Examiner*—Dana Ross
*Assistant Examiner*—Mohammad Yusuf
(74) *Attorney, Agent, or Firm*—Cohen Pontani Lieberman & Pavane LLP

(57) ABSTRACT

A press control system includes at least one sensor for registering current states of at least one component of a press and at least one regulating and control device for generating actuating signals for actuating the at least one component of the press. A press simulator is integrated into the press control system for training purposes and/or diagnostic purposes on the press.

8 Claims, 2 Drawing Sheets

PRESS CONTROL SYSTEM AND PRESS SIMULATOR

BACKGROUND OF THE INVENTION

The present invention relates to a press control system including at least one sensor for registering a current operating state of a component or press, and at least one regulating and control device for actuating the component or press. The present invention further relates to a press simulator for a press.

The printing operation of presses is already controlled and regulated by press control systems according to the prior art. Such press control systems comprise sensors for registering current states of press components and which transmit the current states to a regulating and control device. The regulating and control device generates actuating signals for actuators of the press to influence the press components. Press control systems of this type also have a control desk, at which the current states of the components and the actions of the regulating and control device can be visualized, and at which inputs can be made by a printer in order to influence the functioning of the regulating and control device and therefore of the press.

The prior art also discloses press simulators, with the aid of which the behaviour of presses can be simulated. Such a press simulator is known, for example, from US 2001/0034592 A1. Such press simulators are decoupled from the press control system and the press and are constructed as completely autonomous devices. The press simulators disclosed by the prior art operate on the basis of prefabricated default data, which are substantially identical for all types of presses and, accordingly, are not matched to the configuration of a specific press. Therefore, with the press simulators known from the prior art, no training operation or diagnostic operation matched to a specific press configuration can be run.

SUMMARY OF THE INVENTION

An object of the present invention is to provide a novel press control system and a press simulator.

The object is achieved by a press control system including at least one sensor for registering a current operating state of a component of the press, at least one regulating and control device for actuating the component of the press, and a press simulator integrated into the press control system. According to the invention, a press simulator is integrated into the press control system for training purposes and/or diagnostic purposes on the press. The press simulator operates on the basis of actual press data which are registered by the at least one sensor of the press control system.

The present invention proposes the integration of the press simulator into the press control system. The press simulator operates on the basis of real press data and production data from the press, so that, with the aid of the press simulator, individual training operation is possible that is matched to a specific machine configuration of a client. For example, if production difficulties occur on the press, these can be simulated in real terms in the press simulator, and diagnoses and solutions can be worked out with the aid of the press simulator.

The regulating and control device may be switched between a production operation mode, and a training operation and/or diagnostic operation mode. When the regulating and control device is switched to the training operation and/or the diagnostic operation, the press simulator is activated. When the regulating and control device is switched to the production operation, the press simulator is deactivated.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawing, wherein like reference characters denote similar elements throughout the several views.

DETAILED DESCRIPTION OF THE PRESENTLY PREFERRED EMBODIMENTS

Figure 2:
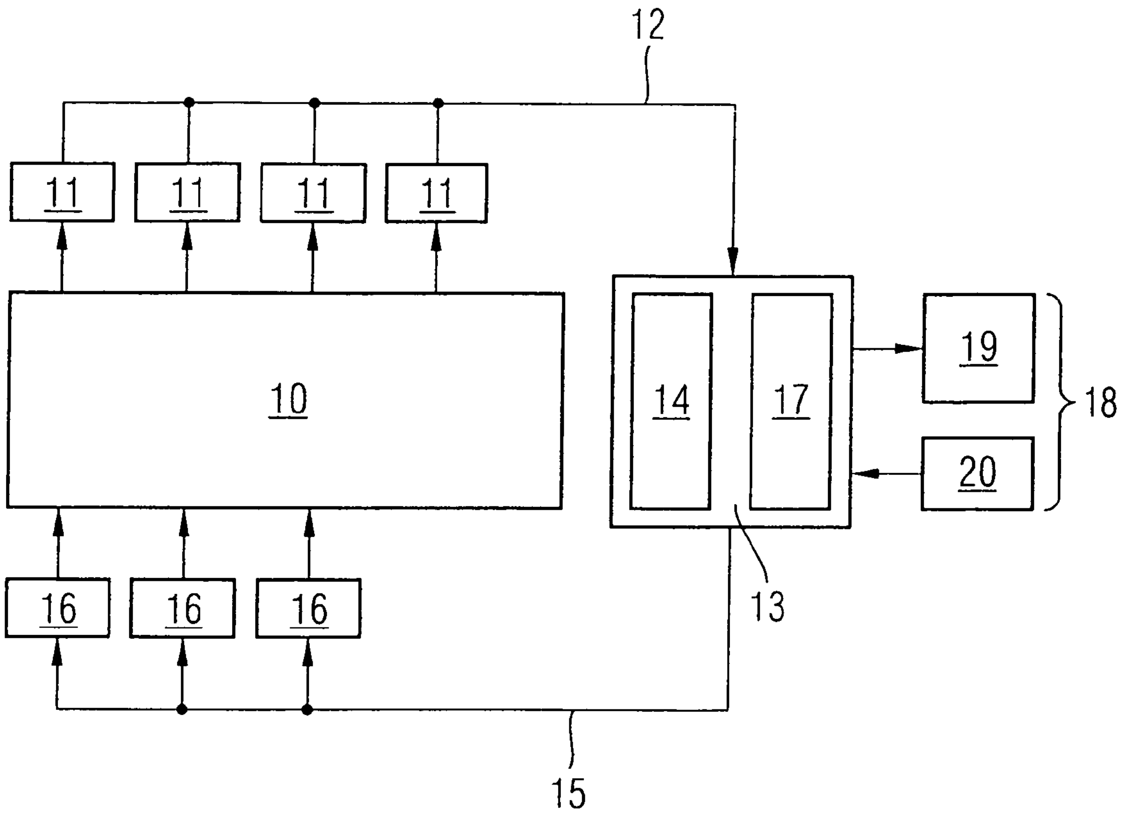
FIG. 2 is a block diagram of the press control system according to the present invention.

FIG. 2 is a block diagram of a press control system for controlling a press 10 such as, for example, a rotary offset printing press. The current state of components of the press 10 are registered using sensors 11. The sensors 11 generate measured signals 12 and transmit the measured signals 12 to a control and regulating device 13 of the press control system. Integrated into the control and regulating device 13 are controllers 14, which generate actuating signals 15 for actuators 16. The actuators 16, in response to the actuating signals, influence the components of the press such that the current states of the components follow predefined desired states.

A press simulator 17 is integrated into the press control system. FIG. 2 shows the preferred embodiment in which the press simulator is integrated into the regulating and control device 13 of the press control system. The press simulator 17 is used to implement training functions and diagnostic functions on the press 10. According to the present invention, the press simulator 17 operates on the basis of actual press data provided by the sensors 11. In this way, by using the press simulator 17, a training operation and diagnostic operation matched to the current configuration of a press 10 are possible. The regulating and control device 13 is switchable between a production operation and at least one of a training operation and a diagnostic operation. When the regulating and control device 13 is in the training operation or the diagnostic operation mode, the press simulator 17 is automatically activated. If, on the other hand, the regulating and control device 13 is switched to the production operation mode, then the press simulator 17 is automatically deactivated.

Figure 1:
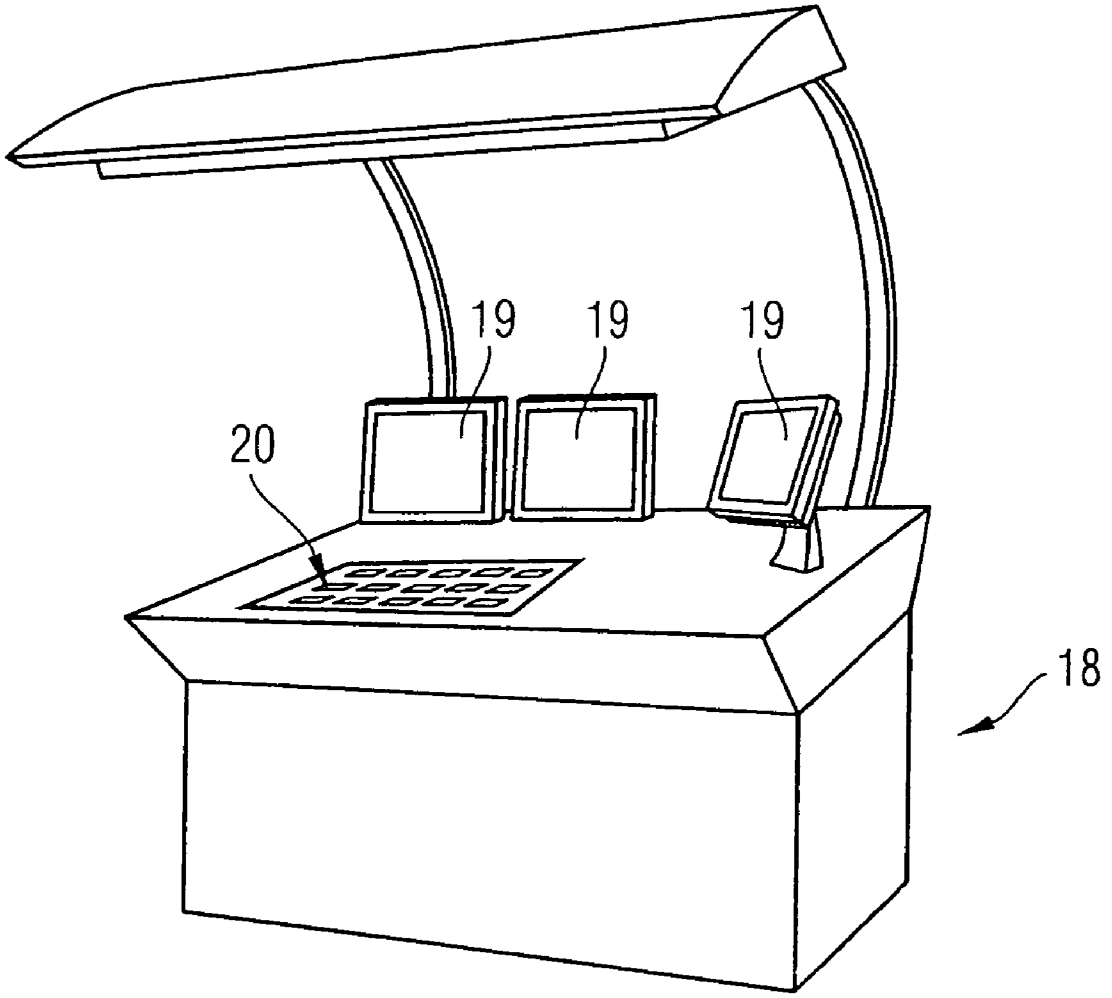
FIG. 1 is a perspective view of a control desk of a press control system according to the present invention.

The press control system of the present invention also includes a control desk 18 comprising display devices 19 and input devices 20. FIG. 1 shows an exemplary embodiment of such a control desk 18. During production operation, the behavior of the press 10 and the behavior of individual components of the press and of the sensors 11 and actuators 16 are visualized on the display devices 19. A printer uses the input device 20 to input commands at the control desk 18 to exert an influence on the press 10 or the press control system. In training operation or diagnostic operation mode, the behavior of the press 10 is simulated visually and in real time on the display devices 19 based on real press data. In the process, client-specific product data from the prepress stage and the current configuration of the press 10 are taken into account. The printer can input command using the input device 20 during the simulation operation or diagnostic operation to influence the simulation operation or diagnostic operation of the press 10 and, for example, to work out solutions for complex fault states of the press 10 during the simulation operation.

With the press control system according to the present invention and the press simulator according to the present invention, operating personnel of presses may be trained to meet demands and to achieve objectives of particular applications. The personnel are trained optimally based on actual press data and by using the actual configuration of the press 10 without using up materials such as printing ink, printing material or other expensive materials required in printing operation. Client-specific product data are taken into account in order to train personnel for a specific press configuration. The press simulator is integrated into the press control system, in particular into a control desk, and is thus part of the press control system. Accordingly, the operating personnel can be trained on the specific machine configuration actually purchased. This allows the training of personnel optimally even at the early stages of commissioning. In this way, delays after commissioning can be reduced. The press simulator is accordingly tailored to a specific press. This makes quicker and more effective training of operating personnel possible. Furthermore, faster and better handling of problems in the event of faults on the press is possible.

Finally, it should also be pointed out that both printing faults and machine faults can be simulated and diagnosed according to the present invention. On a reel changer, for example, paper reel faults, web tension faults and web edge control faults may be simulated. The behavior of all the components of the press may be simulated with the press control system according to the present invention, in particular with the press simulator integrated into the press control system. The components which may be simulated may, for example, include the inking unit, the damping unit, the printing plate cylinders and the blanket cylinders, the impression cylinders, the ink register control and the pretensioning mechanism. Furthermore, faults on pull rolls, metering rolls, cutting devices, turner bars and paper securing devices of a turner bar unit may also be simulated. In addition, the behavior of a folding unit or folder and a stitcher or other components of the press may also be simulated.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A printing press control system for a printing press, comprising:

at least one sensor for registering a current state of at least one component of the printing press;

at least one regulating and control device generating actuating signals for at least one actuator for influencing the at least one component of the printing press;

a printing press simulator integrated into the printing press control system for at least one of training purposes and diagnostic purposes on the printing press, the printing press simulator operating based on real press data from a same printing press in which the printing press simulator is integrated, client-specific product data from a prepress stage and a current configuration of the press; and a printer control desk including display devices and input devices, wherein the display devices and the input devices of the printer control desk are connected to the at least one regulating and control device and the printing press simulator;

wherein said at least one regulating and control device is switchable between a production operation and at least one of a training operation and a diagnostic operation;

wherein said printing press simulator is activated when said at least one regulating and control device is in at least one of the training operation and the diagnostic operation and said printing press simulator is deactivated when said at least one regulating and control device is in the production operation, and wherein the input devices of the printer control influence the printing press during the production operation and the same input devices influence only the printing press simulator in the training or diagnostic operations.

2. The printing press control system of claim 1, wherein said printing press simulator operates based on actual printing press data registered by said at least one sensor.

3. The printing press control system of claim 1, wherein said printing press simulator simulates the behavior of the printing press based on actual printing press data, displays the simulated behavior on the displays included at the printer control desk of the printing press, and adapts the simulation in response to the inputs at the input devices included at the printer control desk of the printing press.

4. A printing press simulator for a printing press integrated into a printing press control system of the printing press, the printing press control system including at least one sensor for registering a current state of at least one component of the printing press or the printing press, at least one regulating and control device generating actuating signals for at least one actuator for influencing at least one component of the printing press or the printing press, and a printer control desk including display devices and input devices, the printing press simulator being connected to the at least one regulating and control device and to the display devices and the input devices on the printer control desk, wherein the printing press simulator operates based on real press data from a same printing press in which the printing press simulator is integrated, client-specific product data from a prepress stage and a current configuration of the press, wherein said at least one regulating and control device is switchable between a production operation and at least one of a training operation and a diagnostic operation, wherein said printing press simulator is activated when said at least one regulating and control device is in at least one of the training operation and the diagnostic operation and said printing press simulator is deactivated when said at least one regulating and control device is in the production operation, and wherein the input devices of the printer control influence the printing press during the production operation and the same input devices influence only the printing press simulator in the training or diagnostic operations.

5. The printing press simulator of claim 4, wherein said printing press simulator operation is based on actual printing press data registered by the at least one sensor.

6. The printing press simulator of claim 4, wherein said printing press simulator simulates the behavior of the printing press based on actual printing press data registered by the at least one sensor, displays the simulated behavior on the displays included at the printer control desk of the printing press, and adapts the simulation in response to the inputs at the input devices included at the printer control desk of the printing press.

7. The printing press simulator of claim 4, wherein the at least one regulating and control device of the printing press is switchable to a production operation, said printing press simulator being deactivated when the control device of the printing press is switched to the production operation.

8. The printing press simulator of claim 4, wherein the at least one regulating and control device of the printing press is switchable to one of a training operation and a diagnostic operation, said printing press simulator being activated when the control device of the printing press is switched to the one of the training operation and the diagnostic operation.

* * * * *